US008567146B2

(12) United States Patent
Hemphill (10) Patent No.: US 8,567,146 B2
(45) Date of Patent: Oct. 29, 2013

(54) METHOD AND APPARATUS FOR REPAIRING CONCRETE

(75) Inventor: William Scott Hemphill, Wilmington, DE (US)

(73) Assignee: Garland Industries, Inc., Cleveland, OH (US)

( * ) Notice: Subject to any disclaimer, the term of this patent is extended or adjusted under 35 U.S.C. 154(b) by 43 days.

(21) Appl. No.: 12/893,229

(22) Filed: Sep. 29, 2010

(65) Prior Publication Data

US 2012/0073231 A1    Mar. 29, 2012

(51) Int. Cl.
*E02D 37/00* (2006.01)

(52) U.S. Cl.
USPC ...... 52/514.5; 52/582.1; 52/586.2; 52/742.12

(58) Field of Classification Search
USPC ............... 52/514, 514.5, 582.1, 586.1, 586.2, 52/742.12
See application file for complete search history.

(56) References Cited

U.S. PATENT DOCUMENTS

| | | | | |
|---|---|---|---|---|
| 1,223,045 | A * | 4/1917 | Ferguson | 404/56 |
| 4,935,301 | A * | 6/1990 | Rerup et al. | 428/375 |
| 5,476,340 | A * | 12/1995 | Contrasto | 404/75 |
| 5,513,925 | A * | 5/1996 | Dempsey et al. | 404/17 |
| 5,763,043 | A * | 6/1998 | Porter et al. | 428/109 |
| 6,052,964 | A * | 4/2000 | Ferm et al. | 52/742.14 |
| 6,183,835 | B1 * | 2/2001 | Cho et al. | 428/113 |
| 6,185,897 | B1 | 2/2001 | Johnson et al. | |
| 6,263,629 | B1 * | 7/2001 | Brown, Jr. | 52/309.16 |
| 6,312,541 | B1 * | 11/2001 | Hemphill | 156/95 |
| 6,330,776 | B1 | 12/2001 | Jinno et al. | |
| 6,389,775 | B1 | 5/2002 | Steiner et al. | |
| 6,416,693 | B1 * | 7/2002 | Lockwood | 264/36.19 |
| 6,532,714 | B1 * | 3/2003 | Ferm et al. | 52/742.12 |
| 7,207,149 | B2 | 4/2007 | Fyfe et al. | |
| RE39,839 | E * | 9/2007 | Wheatley et al. | 156/71 |
| 7,311,964 | B2 * | 12/2007 | Aldea et al. | 428/297.4 |
| 7,574,840 | B1 * | 8/2009 | Fyfe | 52/582.1 |
| 7,736,088 | B2 * | 6/2010 | Boxall et al. | 404/60 |
| 8,087,210 | B2 * | 1/2012 | Agneloni | 52/741.3 |
| 2001/0047844 | A1 * | 12/2001 | Edwards et al. | 156/91 |
| 2001/0049399 | A1 * | 12/2001 | Edwards et al. | 521/101 |
| 2006/0162845 | A1 * | 7/2006 | Bogard et al. | 156/94 |

FOREIGN PATENT DOCUMENTS

EP    441519 A1 *   8/1991

OTHER PUBLICATIONS

Recent developments in the use of FRP anchors and masonry wall strengthening techniques; Alan C. Burr, The Structural Engineer, Sep. 21, 2004, pp. 20-21.
Behaviour of Handmade FRP anchors under tensile load in uncracked concrete; S.J. Kim & S.T. Smith, Advances in Structural Engineering, vol. 12, No. 6, 2009, pp. 845-865.
Experimental behavior of carbon fiber-reinforced polymer (CFRP) sheets attached to concrete surfaces using CRFP anchors; Carl W. Niemitz, et al.; Jour. of Composites for Construction; 2010; pp. 185-194.

(Continued)

*Primary Examiner* — Brian Glessner
*Assistant Examiner* — Adriana Figueroa
(74) *Attorney, Agent, or Firm* — Fay Sharpe LLP (57) ABSTRACT

A composite material used to repair concrete. The composite material includes a first fiber system including at least one fiber layer. Each fiber layer includes a plurality of fibers. The binding material secures together the plurality of fibers. The composite material is positioned and secured in a slot cut in a concrete structure.

37 Claims, 5 Drawing Sheets

(56) References Cited

OTHER PUBLICATIONS

Mechanical properties of CFRP anchorages, Thesis, Middle East Technical Univ. Gokhan Ozdemir; Jan. 2005.

Development of a quality control test for carbon fiber reinforced polymer anchors, Thesis, Univ. of Texas at Austin; Le Tuan Pham; May 2009.

* cited by examiner

METHOD AND APPARATUS FOR REPAIRING CONCRETE

The present invention is directed to a method and apparatus for strengthening concrete, more particularly directed to a method and apparatus for strengthening and/or repairing concrete connections, and still more particularly directed to a method and apparatus for repairing the flange-to-flange connections for precast and prestressed double tee systems.

BACKGROUND OF THE INVENTION

Concrete structures are commonly used for buildings, parking garages and the like. Over time, cracks can develop within concrete structures. If such cracks are left unrepaired, the cracks can result in failure of the structure. This is a particular problem for parking garages wherein large loads from vehicles daily travel over the concrete surface. To prevent the failure of the concrete structure without having to replace the entire concrete structure, the damaged concrete structure is often repaired by cutting the damaged section away from a preexisting concrete section, and then pouring new concrete into the cutout portion. However, new concrete does not always bond perfectly with the preexisting concrete, thus resulting in the propagation of cracks in the joint between the old and new concrete.

Other methods have been used to repair damaged concrete structures and to maintain the mechanical connection between the new concrete section and a preexisting concrete section. One prior art repair method involves first removing the damaged concrete and then drilling holes in the preexisting concrete using a rotary impact hammer drill. Thereafter, an adhesive is placed into the holes, and reinforcing bars are inserted such that the bars extend beyond the outer wall of the preexisting concrete and are generally perpendicular to the joint between the preexisting concrete section and the gap defining the area where the new concrete is to be poured. The new concrete is then poured adjacently to the preexisting concrete such that the ends of the reinforcing bars extend into the new concrete and bond with the new concrete when the new concrete cures. As a result, when the new concrete cures, it will be joined to the preexisting concrete via the reinforcing bars. When attaching external fixtures to preexisting concrete sections, holes are commonly drilled using a standard rotary drill, and the anchors are either bonded or friction-fitted within the drilled holes. The external fixtures are then mounted onto the anchors.

Several disadvantages are associated with these past methods of repair and attachment of newly poured concrete. For instance, the drilling of multiple holes into the existing concrete is a slow and labor intensive process. Additionally, the vibrations associated with the drilling of the holes can cause an entire section of concrete to fail. Moreover, once a hole is drilled, it must be subsequently cleaned of dust and concrete particles in order to permit the adhesive to properly bond to the concrete. Furthermore, cracks can form over time in the joint between the new concrete section and the preexisting concrete. As such, when moisture seeps down these cracks, the metallic reinforcing bars will rust, corrode, and subsequently fail, thereby necessitating further repair of the concrete section. Also, a phenomenon known in the industry as "burping" may occur, whereby air pockets become trapped within the hole once the reinforcing bar is installed, thereby preventing at least a portion of the adhesive from bonding with the reinforcing bar. Such defective bonding can lead to premature failure of the reinforced joint.

The repair of concrete structures such as a parking garage structure, a concrete driveway or the like that is disposed above T-shaped concrete beams can be problematic. The concrete structures are typically joined together by metal clips. As cracks form in the concrete structures, moisture seeps into the concrete supports and corrodes the metal clips. Such metal clip corrosion ultimately causes the metal clip to fail, which can result in the collapsing of a concrete slab within the parking garage. One prior art method to repair this type of damage involves welding or bolting a supplemental joining apparatus to both supports, thereby retaining them together. This method is expensive and labor intensive. Additionally, the repair is aesthetically unappealing. Another prior art method to repair this type of damage involves cutting through the concrete to access and replace the failed metal clip. Again, this process is labor intensive and expensive.

Another prior art method to repair concrete structures disposed above T-shaped concrete beams is disclosed in U.S. Pat. No. 6,312,541, which is incorporated herein by reference. The '541 patent discloses the use of a half-moon shaped molded composite insert that is inserted into a cut slot in the concrete slab. The slot is cut generally perpendicular to the T-shaped concrete beams and across the gap between two concrete structures. An epoxy material is used to secure the composite insert in the cut slot. The composite insert includes a plurality of cavities that facilitate in the bonding of the composite insert within the cut slot in the concrete slab. Although the molded composite insert is an improvement over prior art methods to repair damaged concrete, there remains a continued need to improve the strength and durability of the repaired concrete.

SUMMARY OF THE INVENTION

The present invention is directed to a method and apparatus for strengthening and repairing concrete connections, and more particularly directed to a method and apparatus for repairing the flange-to-flange connections for precast and prestressed double tee systems. The method or repair of the present invention includes the use of an improved composite material that is bonded to a damaged region of concrete. The method of repair of the present invention is simple to implement, generally less expensive than welding or bolting a supplemental joining apparatus to the damaged concrete, and only requires a small region about the damaged concrete to be closed down for repair, thus minimizing the need to close off the complete concrete structure during the repair process. This last advantage is beneficial to car garage owners since the method of repair of the present invention does not require the car garage to be closed or a level of the car garage to be closed while repairing the damaged regions of the car garage.

In one non-limiting aspect of the present invention, the improved composite material includes a first fiber system that is coated, saturated or incorporated in a resin material. The composite material is designed to resist tensile loading and simple shear so as to facilitate in the repair of damaged concrete. The fibers included in composite material can include one or more types of fibers (e.g., carbon fibers, glass fibers aramid fibers [Kevlar, Twaron, etc.], boron fibers, hemp, basalt fibers, etc.). The first fiber system can include one or more layers of fibers. For example, the first fiber system can be formed of a) a single layer of fibers, b) two or more layers of fibers that are oriented in a non-parallel relationship to one another, c) one or more fabric layers wherein each fabric layer includes two or more layers of fibers that are oriented in a non-parallel relationship to one another and which fiber layers are woven or non-woven, and/or stitched together, heat bonded together, or otherwise connected together, or d) some combination of one or more fiber layers and one or more fabric layers. When two or more layers that form the first fiber system are included in the composite material, the adjacently positioned layers can be placed parallel or nonparallel to one another. In one non-limiting embodiment of the invention, the composite material includes one or more layers of first fiber system or the aggregate fibers in the first fiber system have a tensile strength of at least about 50 KSI. The tensile strength is the maximum stress that the fiber can withstand before failure of the fiber. In one non-limiting aspect of this embodiment, the composite material includes one or more layers of first fiber system or the aggregate fibers in the first fiber system have a tensile strength of at least about 300 KSI. In another non-limiting aspect of this embodiment, the composite material includes one or more layers of first fiber system or the aggregate fibers in the first fiber system have a tensile strength of at least about 350 KSI. In still another non-limiting aspect of this embodiment, the composite material includes one or more layers of first fiber system or the aggregate fibers in the first fiber system have a tensile strength of about 350-700 KSI. In yet another non-limiting aspect of this embodiment, the composite material includes one or more layers of first fiber system or the aggregate fibers in the first fiber system have a tensile strength of about 400-675 KSI. In another and/or alternative non-limiting embodiment of the invention, the composite material includes one or more layers of first fiber system or the aggregate fibers in the first fiber system have a tensile modulus of at least about 3 MSI. Tensile modulus is an indicator of the stiffness of the fiber. Tensile modulus is the applied stress on the fiber, based on force and cross-sectional area of the fiber, divided by the observed strain at such stress level. In one non-limiting aspect of this embodiment, the composite material includes one or more layers of first fiber system or the aggregate fibers in the first fiber system have a tensile modulus of at least about 10 MSI. In another non-limiting aspect of this embodiment, the composite material includes one or more layers of first fiber system or the aggregate fibers in the first fiber system have a tensile modulus of at least about 15 MSI. In still another non-limiting aspect of this embodiment, the composite material includes one or more layers of first fiber system or the aggregate fibers in the first fiber system have a tensile modulus of about 15-50 MSI. In yet another non-limiting aspect of this embodiment, the composite material includes one or more layers of first fiber system or the aggregate fibers in the first fiber system have a tensile modulus of about 18-35 MSI. In one non-limiting example, the first fiber system includes one or more layers of carbon fibers or the aggregate fibers in the first fiber system have a tensile strength of about 400-640 KSI and a tensile modulus of about 25-40 MSI. The resin material that is included in the composite material generally includes vinyl ester resins, epoxy resins, polyester resins and/or phenolic resins. In one non-limiting embodiment of the invention, the resin material includes a vinyl ester resin. Generally the one or more layers of first fiber system are partially or fully impregnated with and/or saturated with the resin material.

In another and/or alternative non-limiting aspect of the present invention, the improved composite material includes one or more inner layers of first fiber system sandwiched between two or more outer layers of a second fiber system. The first and second fiber system can include the same or different material. In one non-limiting embodiment of the invention, the composite material includes one or more layers of a first fiber system that are partially or fully impregnated with and/or saturated with one or more types of resin material, and each side of the composite material includes one or more layers of a second fiber system. In one non-limiting aspect of this embodiment, the one or more types of resin material partially or fully secure the one or more layers of second fiber system to the composite material. In another and/or alternative non-limiting aspect of this embodiment, at least one layer of the first and second fiber systems are at least partially formed of different materials. In one non-limiting example, the first fiber system can be formed of a carbon fiber and/or aramid fiber material, and the second fiber system can be formed of a glass fiber material. Generally, the second fiber system is selected to facilitate in the bonding of the composite material to a concrete structure to be repaired and to protect the one or more inner layers of the composite material, and the first fiber system is designed to enhance the strength of the composite material; however, this is not required.

In still another and/or alternative non-limiting aspect of the present invention, the first fiber system in the improved composite material includes at least one fabric layer that includes two or more layers of fibers oriented in a nonparallel relationship to one another. The first fiber system can include more than one fabric layer; however, this is not required. As can be appreciated, the first fiber system can exclusively be formed of one or more fabric layers, or includes one or more fabric layers in combination with one or more fiber layers. The two or more layers of fibers that form the one or more fabric layers in the first fiber system are generally bonded and/or woven together prior to being impregnated and/or saturated with the resin material; however, this is not required. In one non-limiting arrangement, the two or more layers of fibers that form the one or more fabric layers in the first fiber system are stitched together, heat bonded together and/or adhesively connected together. In another and/or alternative non-limiting arrangement, the two or more layers of fibers that form the one or more fabric layers in the first fiber system can be formed of the same or different fiber material. In still another and/or alternative non-limiting arrangement, at least one fabric layer in the first fiber system is formed of at least three fiber layers and the adjacently positioned fiber layers are oriented in a nonparallel relationship to one another. In one particular configuration, for each fiber layer in the first fiber system that runs in a plane non-parallel to the longitudinal axis of the first fiber system, the first fiber system includes a companion fiber layer that also runs in a plane non-parallel to the longitudinal axis of the first fiber system and at a negative angle (e.g., +45° & −45°, +30° & −30°, +60° & −60°, etc.). The volume of fibers used for each fiber layer in the one or more fabric layers used in the first fiber system can be the same or different. In one non-limiting design, the first fiber system includes one or more fabric layers, and at least one of the fabric layers is formed of three fiber layers, and wherein each fiber layer is formed of the same material and each fiber layer has the same volume and same number of fibers. In another non-limiting design, the first fiber system includes one or more fabric layers, and at least one of the fabric layers is formed of three fiber layers, and wherein each fiber layer is formed of the same material, and a first fiber layer runs generally parallel to the longitudinal axis of the fabric layer and the second and third fiber layers run non-parallel to the longitudinal axis of the fabric layer, and the second and third fiber layers have the same volume and same number of fibers. In still another non-limiting design, the first fiber system includes one or more fabric layers, and at least one of the fabric layers is formed of three fiber layers, and wherein each fiber layer is formed of the same material, and a first fiber layer runs generally parallel to the longitudinal axis of the fabric layer and the second and third fiber layers run non-parallel to the longitudinal axis of the fabric layer, and the second and third fiber layers have the same volume and same number of fibers, and the second layer runs at a positive angle A to the longitudinal axis of the fabric layer and the third layer runs at a negative angle A to the longitudinal axis of the fabric layer. In yet another non-limiting design, the first fiber system includes one or more fabric layers, and at least one of the fabric layers is formed of three carbon fiber layers that are stitched together, and a first fiber layer runs generally parallel to the longitudinal axis of the fabric layer and the second and third fiber layers run non-parallel to the longitudinal axis of the fabric layer, and the second and third fiber layers have the same volume and same number of fibers, and the second layer runs at a positive angle A to the longitudinal axis of the fabric layer and the third layer runs at a negative angle A to the longitudinal axis of the fabric layer.

In still yet another and/or alternative non-limiting aspect of the present invention, the second fiber system in the improved composite material can be the same or different from the first fiber system. The second fiber system includes one or more layers of fibers. For example, the second fiber system can be formed of a) a single layer of fibers, b) two or more layers of fibers that are oriented in a non-parallel relationship to one another, c) one or more fabric layers wherein each fabric layer includes two or more layers of fibers that are oriented in a non-parallel relationship to one another and which fiber layers are woven or non-woven, and/or stitched together, heat bonded together, or otherwise connected together, or d) some combination of one or more fiber layers and one or more fabric layers. When two or more layers that form the second fiber system are included in the composite material, the adjacently positioned layers can be placed parallel or nonparallel to one another. In one non-limiting embodiment of the invention, the second fiber system is formed of at least one fabric layer that includes two or more layers of fibers oriented in a nonparallel relationship to one another; however, this is not required. The second fiber system can include more than one fabric layer; however, this is not required. As can be appreciated, the second fiber system can exclusively be formed of one or more fabric layers, or includes one or more fabric layers in combination with one or more fiber layers. The two or more layers of fibers that form the one or more fabric layers in the second fiber system are generally bonded and/or woven together prior to being impregnated and/or saturated with the resin material; however, this is not required. In one non-limiting arrangement, the two or more layers of fibers that form the one or more fabric layers in the second fiber system are stitched together, heat bonded together and/or adhesively connected together. In still another and/or alternative non-limiting arrangement, the two or more layers of fibers that foil the one or more fabric layers in the second fiber system can be formed of the same or different fiber material. In another and/or alternative non-limiting arrangement, at least one fabric layer in the second fiber system is formed of at least three fiber layers and the adjacently positioned fiber layers are oriented in a nonparallel relationship to one another. In one particular configuration, for each fiber layer in the second fiber system that runs in a plane non-parallel to the longitudinal axis of the second fiber system, the second fiber system includes a companion fiber layer that also runs in a plane non-parallel to the longitudinal axis of the second fiber system and at a negative angle (e.g., +45° & −45°, +30° & −30°, +60° & −60°, etc.). The volume of fibers used for each fiber layer in the one or more fabric layers used in the second fiber system can be the same or different. In one non-limiting design, the second fiber system includes one or more fabric layers, and at least one of the fabric layers is formed of three fiber layers, and wherein each fiber layer is formed of the same material and each fiber layer has the same volume and same number of fibers. In another non-limiting design, the second fiber system includes one or more fabric layers, and at least one of the fabric layers is formed of three fiber layers, and wherein each fiber layer is formed of the same material, and a first fiber layer runs generally parallel to the longitudinal axis of the fabric layer and the second and third fiber layers run non-parallel to the longitudinal axis of the fabric layer, and the second and third fiber layers have the same volume and same number of fibers. In still another non-limiting design, the second fiber system includes one or more fabric layers, and at least one of the fabric layers is formed of three fiber layers, and wherein each fiber layer is formed of the same material, and a first fiber layer runs generally parallel to the longitudinal axis of the fabric layer and the second and third fiber layers run non-parallel to the longitudinal axis of the fabric layer, and the second and third fiber layers have the same volume and same number of fibers, and the second layer runs at a positive angle A to the longitudinal axis of the fabric layer and the third layer runs at a negative angle A to the longitudinal axis of the fabric layer. In yet another non-limiting design, the second fiber system includes one or more fabric layers, and at least one of the fabric layers is formed of three glass fiber layers that are stitched together, and a first fiber layer runs generally parallel to the longitudinal axis of the fabric layer and the second and third fiber layers run non-parallel to the longitudinal axis of the fabric layer, and the second and third fiber layers have the same volume and same number of fibers, and the second layer runs at a positive angle A to the longitudinal axis of the fabric layer and the third layer runs at a negative angle A to the longitudinal axis of the fabric layer. The tensile strength and/or tensile modulus of one or more fiber layers or all of the fibers layers in the second fiber system can be the same as or different to the tensile strength and/or tensile modulus of one or more fiber layers or all of the fibers in the first fiber system. In one non-limiting embodiment of the invention, the composite material includes one or more layers of second fiber system or the aggregate fibers in the second fiber system have a tensile strength of at least about 50 KSI. In one non-limiting aspect of this embodiment, the composite material includes one or more layers of second fiber system or the aggregate fibers in the second fiber system have a tensile strength of at least about 300 KSI. In another non-limiting aspect of this embodiment, the composite material includes one or more layers of second fiber system or the aggregate fibers in the second fiber system have a tensile strength of at least about 350 KSI. In still another non-limiting aspect of this embodiment, the composite material includes one or more layers of second fiber system or the aggregate fibers in the second fiber system have a tensile strength of about 350-700 KSI. In yet another non-limiting aspect of this embodiment, the composite material includes one or more layers of second fiber system or the aggregate fibers in the second fiber system have a tensile strength of about 400-675 KSI. In another and/or alternative non-limiting embodiment of the invention, the composite material includes one or more layers of second fiber system or the aggregate fibers in the second fiber system have a tensile modulus of at least about 3 MSI. In one non-limiting aspect of this embodiment, the composite material includes one or more layers of second fiber system or the aggregate fibers in the second fiber system have a tensile modulus of at least about 5 MSI. In another non-limiting aspect of this embodiment, the composite material includes one or more layers of second fiber system or the aggregate fibers in the second fiber system have a tensile modulus of at least about 6 MSI. In still another non-limiting aspect of this embodiment, the composite material includes one or more layers of second fiber system or the aggregate fibers in the second fiber system have a tensile modulus of about 6-25 MSI. In yet another non-limiting aspect of this embodiment, the composite material includes one or more layers of second fiber system or the aggregate fibers in the second fiber system have a tensile modulus of about 6-15 MSI. In one non-limiting example, the second fiber system includes one or more layers of glass fibers or the aggregate fibers in the second fiber system have a tensile strength of about 250-680 KSI and a tensile modulus of about 6.5-13 MSI. The resin material that is used to bond the second fiber system to the first fiber system generally includes vinyl ester resins, epoxy resins, polyester resins and/or phenolic resins. In one non-limiting embodiment of the invention, the resin material includes a vinyl ester resin. Generally the one or more layers of the second fiber system are partially or fully impregnated with and/or saturated with the resin material.

In another and/or alternative non-limiting aspect of the present invention, the improved composite material includes a first fiber system that includes one or more fabric layers and a second fiber system that includes one or more fabric layers secured by the resin material to at least one side of the fabric layer of the first fiber system. In one non-limiting embodiment of the invention, the improved composite material includes a first fiber system and a second fiber system that are connected together by a resin material. The second fiber system includes two fabric layers wherein one fabric layer of the second fiber system is connected to one side of the fabric layer of the first fiber system and the second fabric layer of the second fiber system is connected to the other side of the fabric layer of the first fiber system. In another non-limiting embodiment of the invention, the improved composite material includes a first fiber system and a second fiber system that are connected together by a resin material. The first fiber system includes two fabric layers. The first side of the two fabric layers of the first fiber system is connected together. The two fabric layers of the first fabric component have a similar size and shape and are generally symmetrically oriented together with one another. The second fiber system includes two fabric layers wherein one fabric layer of the second fiber system is connected to the second side of one of the fabric layers of the first fiber system and the second fabric layer of the second fiber system is connected to the second side of the other fabric layer of the first fiber system such that the two fabric layers of the first fiber system are sandwiched between the two fabric layers of the second fiber system. As can be appreciated, more than two fabric layers of the first fiber system can be sandwiched between the two fabric layers of the second fiber system. As also or alternatively can be appreciated, more than one fabric layer of the second fiber system can be connected to a second side of a fabric layer of the first fiber system. The fabric layers of the first and second fiber systems can be connected together by stitching, adhesive, melt bonding, and/or use of one or more resin materials.

In still another and/or alternative non-limiting aspect of the present invention, the improved composite material is formed by saturating and/or impregnating the first and second fiber systems with a resin material and then pressing the first and second fiber systems together until the resin cures. A vacuum can optionally be applied during the pressing and curing steps. The process for forming the composite material can be by a batch process or a continuous process. The resin material can be pre-applied and/or applied as the fiber components are brought together. The layer of the fiber components can be preformed; however, this is not required.

In yet another and/or alternative non-limiting aspect of the present invention, the improved composite material has a certain size, shape and thickness to achieve the desired repair strength for the damaged concrete. In one non-limiting embodiment of the invention, the longitudinal length of the composite material is at least about 8 inches. The maximum longitudinal length is about 25 inches. When the length of the composite material is less than about 8 inches, the desired resistance to tensile loading and simple shear is generally not achieved. When the length of the composite material is greater than about 25 inches, little, if any, improvement in resistance to tensile loading and simple shear is noticed. The width or height of the composite material is selected to be generally less than the thickness of the concrete being repaired; however, this is not required. In one non-limiting embodiment, the height or depth of the composite material is at least about 2 inches. In one non-limiting aspect of this embodiment, the height or depth of the composite material is about 2-6 inches, and typically about 2.5-5 inches. The width or thickness of the composite material will vary depending on the thickness of the first fiber system and optional second fiber system. In one non-limiting embodiment, the thickness of the composite material is at least about 0.05 inches. In one non-limiting aspect of this embodiment, the thickness of the composite material is about 0.08-0.5 inches, and typically about 0.1-0.3 inches. The thickness of the composite material can be uniform or vary. In one non-limiting aspect of the invention, when the thickness varies, generally the middle portion of the composite material is thicker than the two end sections of the composite material. The shape of the composite material is generally selected to fit within a repair cut slot in the concrete. In one non-limiting aspect of the invention, the two side profiles of the composite material along the longitudinal length of the composite material can be generally square or rectangular. In another non-limiting aspect of the invention, the two side profiles of the composite material along the longitudinal length of the composite material have the top and bottom edges of the composite material in a generally parallel relationship to one another and one or both of the ends of the composite material includes a curved surface or are fully formed of a curved surface. When the one or both ends of the composite material are not fully formed of a curved surface, generally about 20-99% of one or both ends include a curved surface, typically about 40-99% of one or both ends include a curved surface, and more typically about 51-99% of one or both ends include a curved surface. The radius of curvature of the one or more curved surfaces is generally about 4-9 inches.

In still yet another and/or alternative non-limiting aspect of the present invention, the improved composite material has a non-smooth outer surface to enhance the adhesive bonding of composite material inside the repair slot formed in the concrete; however, this is not required. The non-smooth surface can be formed by a) the surface texture of the outer layers of the fabric and/or fiber layers, b) a molded or stamped surface texture, and/or c) the including of cut fibers bonded to the outer surface of the composite material. Generally, the composite material does not include any openings or holes that detract from the strength of the composite material.

In another and/or alternative non-limiting aspect of the present invention, the improved composite material has a tensile strength along the x-y axis or longitudinal axis of at least about 50 KSI, a compressive strength along the x-y axis or longitudinal axis of at least about 40 KSI, a compressive strength through the z axis or thickness of at least about 5 KSI, a shear strength through the z axis or thickness of at least about 10 KSI, and/or an inter laminar shear along the x-y axis or longitudinal axis of at least about 1 KSI. In one non-limiting embodiment of the invention, the improved composite material has a tensile strength along the x-y axis or longitudinal axis of at least about 50 KSI. In one non-limiting aspect of this embodiment, the improved composite material has a tensile strength along the x-y axis or longitudinal axis of at least about 75 KSI. In another non-limiting aspect of this embodiment, the improved composite material has a tensile strength along the x-y axis or longitudinal axis of at least about 80 KSI. In still another non-limiting aspect of this embodiment, the improved composite material has a tensile strength along the x-y axis or longitudinal axis of about 80-150 KSI. In yet another non-limiting aspect of this embodiment, the improved composite material has a tensile strength along the x-y axis or longitudinal axis of about 80-120 KSI. In still yet another non-limiting aspect of this embodiment, the improved composite material has a tensile strength along the x-y axis or longitudinal axis of about 95-120 KSI. In another and/or alternative non-limiting embodiment of the invention, the improved composite material has a compressive strength along the x-y axis or longitudinal axis of at least about 40 KSI. In one non-limiting aspect of this embodiment, the improved composite material has a compressive strength along the x-y axis or longitudinal axis of at least about 60 KSI. In another non-limiting aspect of this embodiment, the improved composite material has a compressive strength along the x-y axis or longitudinal axis of at least about 75 KSI. In still another non-limiting aspect of this embodiment, the improved composite material has a compressive strength along the x-y axis or longitudinal axis of about 75-135 KSI. In yet another non-limiting aspect of this embodiment, the improved composite material has a compressive strength along the x-y axis or longitudinal axis of about 80-120 KSI. In still yet another non-limiting aspect of this embodiment, the improved composite material has a compressive strength along the x-y axis or longitudinal axis of about 85-110 KSI. In still another and/or alternative non-limiting embodiment of the invention, the improved composite material has a compressive strength through the z axis or thickness of at least about 5 KSI. In one non-limiting aspect of this embodiment, the improved composite material has a compressive strength through the z axis or thickness of at least about 6 KSI. In another non-limiting aspect of this embodiment, the improved composite material has a compressive strength through the z axis or thickness of at least about 7 KSI. In still another non-limiting aspect of this embodiment, the improved composite material has a compressive strength through the z axis or thickness of about 7-12 KSI. In yet another non-limiting aspect of this embodiment, the improved composite material has a compressive strength through the z axis or thickness of about 8-11 KSI. In yet another and/or alternative non-limiting embodiment of the invention, the improved composite material has a shear strength through the z axis or thickness of at least about 10 KSI. In one non-limiting aspect of this embodiment, the improved composite material has a shear strength through the z axis or thickness of at least about 12 KSI. In another non-limiting aspect of this embodiment, the improved composite material has a shear strength through the z axis or thickness of at least about 14 KSI. In still another non-limiting aspect of this embodiment, the improved composite material has a shear strength through the z axis or thickness of at least about 16 KSI. In yet another non-limiting aspect of this embodiment, the improved composite material has a shear strength through the z axis or thickness of about 16-30 KSI. In yet another non-limiting aspect of this embodiment, the improved composite material has a shear strength through the z axis or thickness of about 18-25 KSI. In still yet another non-limiting aspect of this embodiment, the improved composite material has a shear strength through the z axis or thickness of about 19-23 KSI. In still yet another non-limiting aspect of this embodiment, the improved composite material has an inter laminar shear along the x-y axis or longitudinal axis of at least about 1 KSI. In one non-limiting aspect of this embodiment, the improved composite material has an inter laminar shear along the x-y axis or longitudinal axis of at least about 1.2 KSI. In another non-limiting aspect of this embodiment, the improved composite material has an inter laminar shear along the x-y axis or longitudinal axis of at least about 1.4 KSI. In still another non-limiting aspect of this embodiment, the improved composite material has an inter laminar shear along the x-y axis or longitudinal axis of about 1.4-3 KSI. In still another non-limiting aspect of this embodiment, the improved composite material has an inter laminar shear along the x-y axis or longitudinal axis of about 1.8-2.4 KSI.

In still another and/or alternative non-limiting aspect of the present invention, the improved composite material is adhesively connected to the concrete. Many different types of adhesives can be used. Generally, the adhesive is an epoxy adhesive; however, other or additional adhesives can be used. When an epoxy adhesive is used, the epoxy is generally a two part, 100% solids epoxy that is thixotropic in nature. This type of adhesive bonds well to both the composite material and the concrete. However, other adhesives that include acrylics, poly ureas, methacrylates and/or polyesters can also or alternatively be used. The curing time for the adhesive is generally about 1-5 hours, depending on the temperature. The bonding strength of the composite material to the concrete is at least about 1 KSI. In one embodiment of the invention, bonding strength of the adhesive to the concrete is at least about 1.5 KSI. In one non-limiting aspect of this embodiment, the bonding strength of the adhesive to the concrete is at least about 1.8 KSI. In another non-limiting aspect of this embodiment, the bonding strength of the adhesive to the concrete is at least about 2 KSI. In still another non-limiting aspect of this embodiment, the bonding strength of the adhesive to the concrete is about 2-5 KSI. In yet another non-limiting aspect of this embodiment, the bonding strength of the adhesive to the concrete is about 2.2-4 KSI. In still yet another non-limiting aspect of this embodiment, the bonding strength of the adhesive to the concrete is about 2.4-3.2 KSI. The adhesive used to bond the composite material to the concrete can be the same or different from the adhesive or resin used to bond one or more fibers layers together in the composite material.

In yet another and/or alternative non-limiting aspect of the present invention, a slot is cut into the concrete slab so that the composite material can be fully or partially inserted into the repair cut slot. The size, length and depth of the slot are selected to ensure that the composite material is properly inserted into the repair cut slot of the concrete. Generally only one piece of composite material is placed in a slot; however, it can be appreciated that more than one piece of composite material can be placed in a slot. In one non-limiting embodiment of the invention, the slot width is at least about 50% the width or thickness of the composite material. The minimum slot width is selected to ensure that a sufficient amount of bonding material can be positioned between the composite material and the concrete. In addition, the slot width is not greater than about 500% the width or thickness of the composite material. A slot width that is too large will result in the improper bonding of the composite material to the concrete. A too large slot will result in a thick adhesive layer which can result in the failure in the adhesive from shear prior to the composite fully engaging the forces being applied to the concrete. In one non-limiting aspect of this embodiment, the slot width in the concrete is about 75%-300% the width or thickness of the composite material. In another non-limiting aspect of this embodiment, the slot width in the concrete is about 100%-250% the width or thickness of the composite material. The slot width may or may not be constant along the longitudinal length of the slot. It has been found that the wobble and variation of slot can enhance the bond between the concrete and composite material by adding texture to the inside of the slot. In another non-limiting embodiment of the invention, the slot depth is at least about 75% of the depth or height of the composite material. The depth of the slot is limited by the thickness of the concrete. Generally, the slot should not be cut fully through the concrete. In one non-limiting aspect of this embodiment, the slot depth is at least about 0.1 inches less than the thickness of the concrete. In another non-limiting aspect of this embodiment, the slot depth is at least about 100% of the depth or height of the composite material and at least about 0.2 inches less than the thickness of the concrete. In still another non-limiting aspect of this embodiment, the slot depth is at least about 105% of the depth or height of the composite material and at least about 0.25 inches less than the thickness of the concrete. In yet another non-limiting aspect of this embodiment, the slot depth is at least about 110% of the depth or height of the composite material and at least about 0.325 inches less than the thickness of the concrete. When the slot depth is greater than the slot depth or height, the top of the composite is generally placed below the top surface of the concrete and the adhesive is generally placed over the top of the composite material after the composite material is placed in the slot so as to protect the composite material; however, this is not required. In still another non-limiting embodiment of the invention, the slot length generally is at least about 100% the longitudinal length of the composite material. In another non-limiting aspect of the present invention, the slot length generally is at least about 101-115% the longitudinal length of the composite material.

In still another and/or alternative non-limiting aspect of the present invention, a slot is cut into one or more concrete structures or slabs at a nonparallel angle to a gap between the two concrete structures or slabs. Generally, in a structure such as, but not limited to a parking garage, T-shaped beams (e.g., T-shaped concrete beams, etc.) are used to support a plurality of concrete structures or slabs. In such an arrangement, a gap exists between the two concrete structures or slabs. The cut slot of the present invention is cut at a nonparallel angle to such gap and is also cut into the concrete structures or slabs positioned on both sides of the gap. The size, length and depth of the repair cut slot are selected to ensure that the improved composite material is properly inserted into the repair cut slot of the concrete structure or slab. In one non-limiting embodiment of the invention, the angle of the cut slot relative to the gap between the two concrete structures or slabs is about 10°-170°. In one non-limiting aspect of this embodiment, the angle of the cut slot relative to the gap between the two concrete structures or slabs is about 20°-160°. In another non-limiting aspect of this embodiment, the angle of the cut slot relative to the gap between the two concrete structures or slabs is about 30°-150°. In another non-limiting aspect of this embodiment, the angle of the cut slot relative to the gap between the two concrete structures or slabs is about 45°-135°. It has been found that when the angle of the cut slot relative to the gap between the two concrete structures or slabs is about 45°-135°, the full load transfer of the composite material to the concrete is obtained and a very high lateral shear in the joint is also obtained. The 45°-135° angle allows the composite material to handle the forces in tension rather than through thickness shear. Generally, the slot is cut so that the slot is centered between the two concrete structures or slabs; however, this is not required. When more than one slot is cut into the two concrete structures or slabs, the slots can be cut in a parallel or nonparallel relationship to one another. In one non-limiting arrangement, two adjacent positioned slots are cut at +/−30-60°. Such alternating slots allow for the maximum tension transfer to the composite material in the slots.

In yet another and/or alternative non-limiting aspect of the present invention, the adhesive used to secure the composite material in the slot or opening in the concrete structure generally fills the remaining void in the cut slot or opening after the composite material is inserted into the slot or opening. Prior to the adhesive and/or the composite material being inserted into the slot or opening, the slot or opening is generally cleaned. The slot or opening can be cleaned by various means (e.g., pressurized air, water, cleaning solvent, etc.). In one arrangement, the slot or opening is cleaned out with 30-150 psi or greater oil free compressed air. Generally adhesive is placed in the slot or opening prior to the composite material being inserted into the slot or opening. One or both sides of the composite material can be optionally coated with adhesive prior to the composite material being inserted into the slot or opening. In one non-limiting arrangement, adhesive is placed in the slot or opening prior to the composite material being inserted into the slot or opening and both sides of the composite material are coated with adhesive prior to the composite material being inserted into the slot or opening.

In still yet another and/or alternative non-limiting aspect of the present invention, when more than one portion of a concrete structure are to be repaired by the composite material, the slot angles of the multiple slots can be selected to improve the strength of the repaired region; however, this is not required. In one non-limiting embodiment of the invention, a plurality of slots are cut in the concrete structure at an angle generally parallel to one another. In another non-limiting embodiment of the invention, a plurality of slots are cut in the concrete structure at an angle that is negative to the angle of another cut slot (e.g., +30° & −30°, +45° & −45°, +60° & −60°, etc.).

In another and/or alternative non-limiting aspect of the present invention, there is provided a novel method for repairing one or more damaged concrete structures or slabs that are supported relative to one another such as by, but not limited to, T-shaped beams. The basic steps for the novel method of repairing adjacently positioned concrete structures or slabs are as follows: 1) cutting a generally linear slot into the adjacently positioned concrete structures or slabs such that a cut slot crosses a portion of the damaged region of the concrete structure, 2) inserting the improved composite material into the slot such that the improved composite material spans across the gap between the adjacently positioned concrete structures or slabs, and 3) securing the improved composite material in the slot. The novel method for repairing can include additional steps; however, this is not required. Such additional steps include, but are not limited to, a) cutting the slot into the adjacently positioned concrete structures or slabs such that each concrete structure or slab has generally the same slot length, slot width, slot depth, and/or slot profile, b) cutting the slot into the adjacently positioned concrete structures or slabs at a particular angle relative to the gap between the adjacently positioned concrete structures or slabs, c) cleaning the slot prior to inserting the improved composite material into the cut slot, d) using a particular length, thickness, vertical width, shape and/or composition for the improved composite material, e) placing masking about the cut slot to inhibit or prevent bonding material from contacting the top surface of the concrete that is located adjacent to the cut slot, f) inserting a bonding material into one or more portions of the slot prior to inserting the improved composite material into the cut slot, g) applying a bonding material and/or primer to one or more outer surfaces of the improved composite material prior to inserting the improved composite material into the cut slot, h) inserting the improved composite material into the cut slot until the top edge of the improved composite material is positioned flush with or positioned below the top surface of the concrete that is located adjacent to the cut slot, i) applying a bonding material on the top surface of the concrete that is located adjacent to the cut slot and over the top edge of the improved composite material that is located in the cut slot, j) removing the damaged concrete and replacing the damaged concrete with new concrete and/or durable polymer material (e.g., epoxy, etc.), k) cutting the cut slot through the damaged region of concrete so that the improved composite material facilitates in securing the new concrete and/or durable polymer material in the region that the damaged concrete form was removed, and/or l) alternating the cut slot angle of multiple cut slots in the concrete structure. As can be appreciated, one or more of the above listed additional steps can be used in the method of the present invention. Also, it will be appreciated that any combination of the above listed additional steps can be used in the method of the present invention. Lastly, it can be appreciated that all of the above listed additional steps can be used in the method of the present invention.

The composite material has several advantages, namely:

The shape of the composite material has two parallel sides that extend for a sufficient distance so that enough of the cut sections of the two concrete sections can be bonded to the composite material.

The orientation of the fibers in the composite material provide for greater strength.

The composite material does not need to be placed through a metal clip that is used to connect together two T-shaped planks.

The composite material has no holes or slots though the body of the composite material that would compromise the strength of the composite material.

Less adhesive is required to secure the composite material in a cut slot in the concrete.

The composite material has improved tensile capacity, compressive capacity and shear capacity.

The composite material is versatile and can be used in many different concrete repair applications.

The composite material is designed to adequately engage the tee beam with enough area to form a desired bond with the desired strength.

It is one non-limiting object of the present invention to provide a method and apparatus for repairing concrete that is not as labor intensive as previous repair systems.

It is another and/or alternative non-limiting object of the present invention to provide a method and apparatus for repairing concrete that will not corrode over time.

It is still another and/or alternative non-limiting object of the present invention to provide a method and apparatus for repairing concrete that includes the use of an improved composite material.

It is yet another and/or alternative non-limiting object of the present invention to provide a method and apparatus for repairing concrete that minimizes the risk of damaging preexisting concrete during the repair process.

It is still yet another and/or alternative non-limiting object of the present invention to provide a method and apparatus for repairing two adjacent preexisting sections of concrete.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the invention may take in physical form and in certain parts and arrangement of parts wherein.

DETAILED DESCRIPTION OF THE NON-LIMITING EMBODIMENTS

Figure 1:
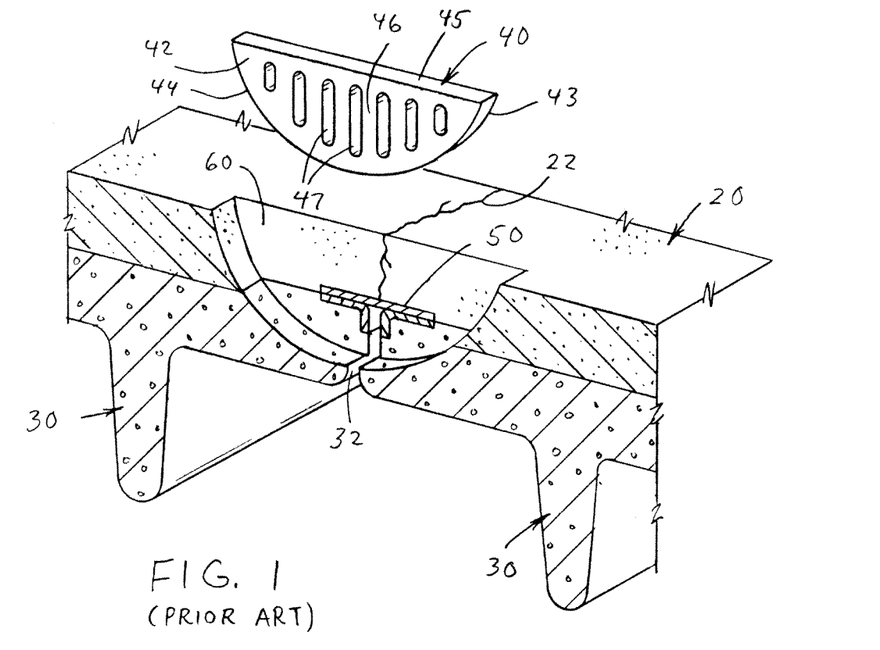
FIG. 1 is a fragmentary perspective view in cross-section of two preexisting sections of concrete to be joined by a prior art concrete insert.
Figure 2:
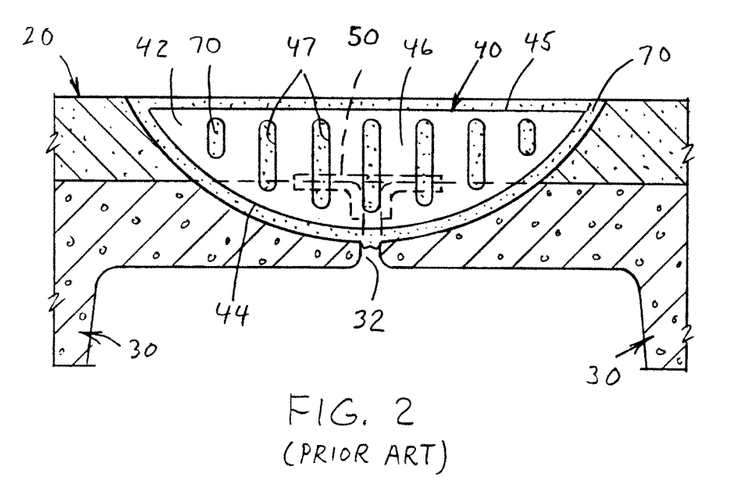
FIG. 2 is a sectional side elevation view of the preexisting sections of concrete of FIG. 1 joined by the prior art concrete insert.

Referring now to the drawings wherein the showings are for the purpose of illustrating preferred embodiments of the invention only and not for the purpose of limiting same, FIGS. 1 and 2 illustrate a typical concrete deck 20 that is disposed above concrete T-shaped planks 30. A prior art concrete insert 40 as disclosed in U.S. Pat. No. 6,312,541 is illustrated as forming a repair to the damaged concrete deck. The concrete deck is also illustrated as supported by metal clips 50 that join together the concrete T-shaped planks 30. The concrete insert 40 is designed to repair the metal clips 50 that have failed as a result of corrosion from moisture that has seeped into cracks 22 that have formed in concrete deck 20. The concrete insert 40 is illustrated as a relatively thin, elongated oblong-shaped structure having first and second major surfaces 42 and 43, a flat top 45 and an arcuate side or edge 44. Edge 44 is curved. The peripheral shape of edge 44 at least approximates the shape of slot 60. The major surfaces 42 and 43 of the concrete insert can be textured to improve bonding of the concrete insert with epoxy 70. The texturing may take the form of ridges, dimples, or any other rough or uneven surface topography. The concrete insert 40 can have interior walls 46 that define cavities 47 formed in the major surfaces 42 and 43 that extend into, and preferably through, the concrete insert to allow the epoxy 70 to flow into the cavities 47 and bond to the concrete insert, as illustrated in FIG. 2. The cavities 47 may be one of any size and shape as long as they function to increase bonding of the epoxy 70 to the concrete insert without unduly reducing the strength of the concrete insert. The concrete insert preferably is formed from a corrosion-resistant composite material. Any material that resists corrosion and is capable of bonding to both adhesives and concrete could be used such as a molded thermoplastic material reinforced with fibers of glass, carbon, or the like. When concrete insert is molded, the major surfaces 42 and 43 can be textured where the embedded fibers within the concrete insert form ridges in the major surfaces. Additionally, the mold may comprise indentations, thereby forming dimples on the exterior of the concrete insert during the molding process.

FIG. 1 illustrates that the T-shaped planks 30 are rejoined by forming a slot 60, in the concrete deck 20, through metal clip 50 and partially into the T-shaped planks 30. A circular diamond saw blade is used to form slot 60. Epoxy 70 is inserted into slot 60 and then the concrete insert 40 is inserted into the slot. When the epoxy dries, the epoxy bonds the concrete insert to the concrete T-shaped planks 30 and the concrete deck 20, thereby retaining the concrete T-shaped planks in place relative to each other.

The composite material 100 of the present invention and method for inserting the composite material into concrete in accordance with the present invention is an improvement over the concrete insert 40 illustrated in FIGS. 1 and 2 and disclosed in U.S. Pat. No. 6,312,541, which is fully incorporated herein by reference.

Figure 3:
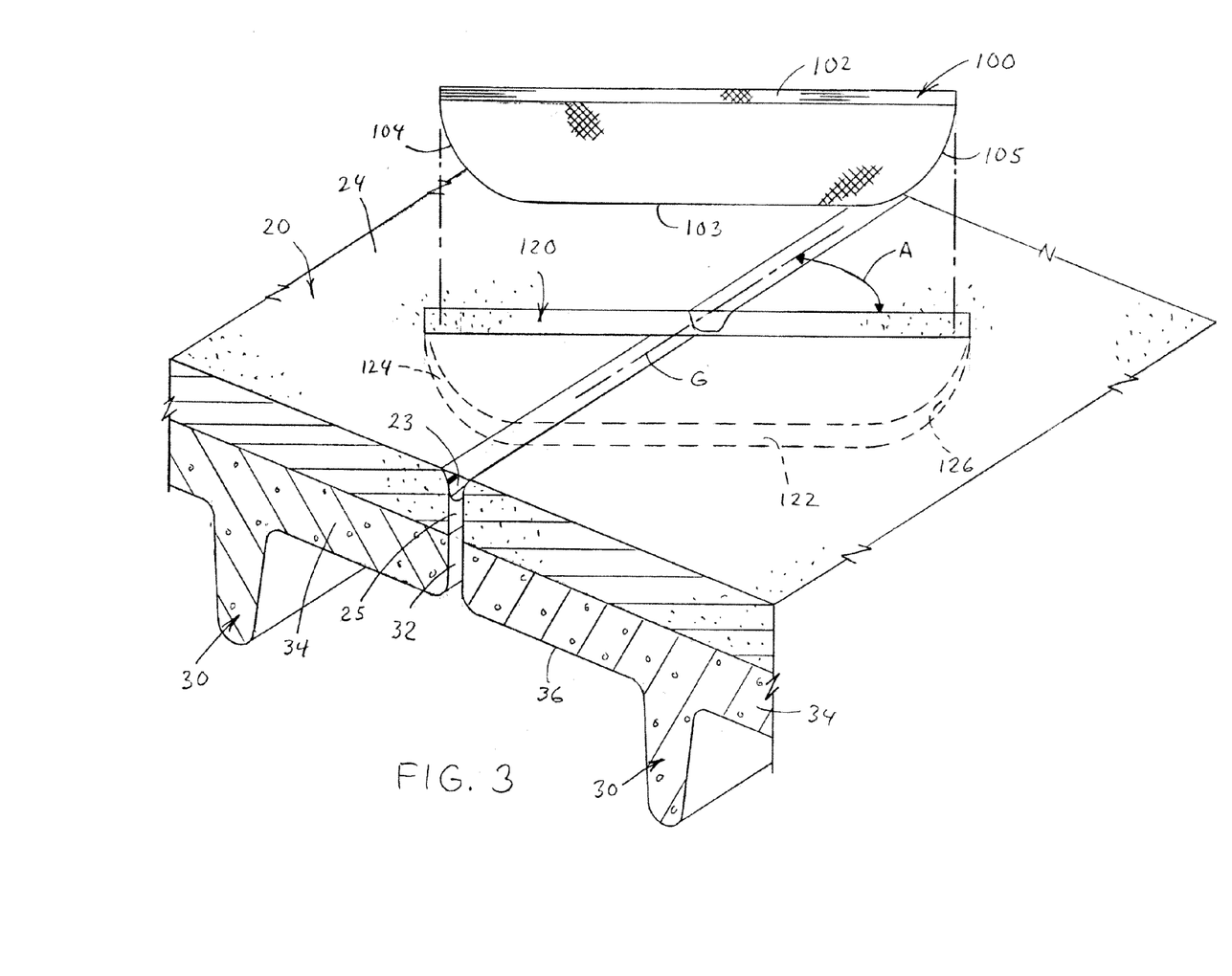
FIG. 3 is a fragmentary perspective view in cross-section of two preexisting sections of concrete to be joined by the composite material of the present invention.
Figure 4:
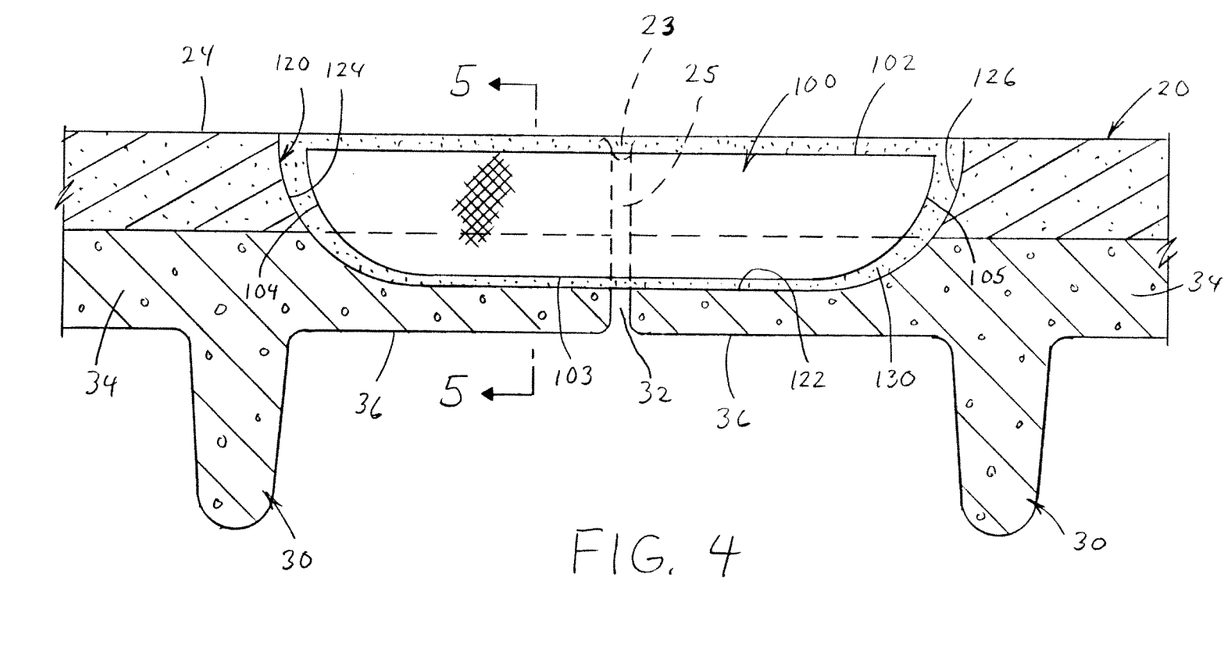
FIG. 4 is a sectional side elevation view of the preexisting sections of concrete of FIG. 3 joined by the composite material of the present invention.
Figure 5:
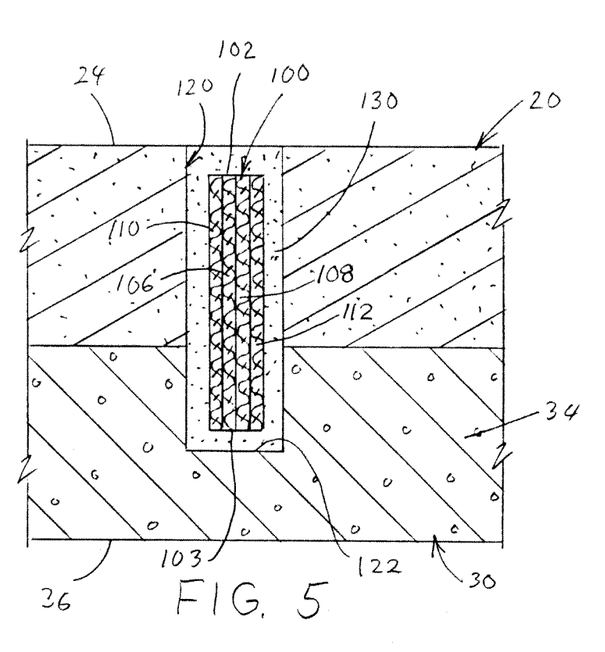
FIG. 5 is a cross-sectional view along lines 5-5 of FIG. 4.

Referring now to FIGS. 3-5, there is illustrated composite material 100 being used to repair a typical concrete deck 20 that is disposed above concrete T-shaped planks 30. FIG. 3 does not illustrate a metal clip 50 spanning a gap 32 between two T-shaped planks 30. In practice, the metal clips are spaced apart from one another along the longitudinal length or axis G of gap 32. As mentioned above, the metal clips are used to secure together the two adjacently positioned T-shaped planks 30. FIG. 3 illustrates a tooled joint or gap 25 formed in the concrete deck 20. The tooled joint includes a sealant 23 on the top portion of the tooled joint that covers a gap 25 between the two sections of the concrete deck. Over time, moisture leaks through sealant 23 and into gap 25 thereby resulting in moisture contacting a metal clip, not shown, and causing the metal clip to corrode, thereby compromising the structural strength of the metal clip.

The composite material of the present invention is designed to quickly, easily and effectively repair the damaged connection between the two adjacently positioned T-shaped planks. As also can be appreciated, the composite material of the present invention can be used as a substitute for metal clips that have previously been used to connect two adjacently positioned T-shaped planks. As such, originally installed T-shaped planks can eliminate the use of metal clips that corrode over time and be substituted for the composite material of the present invention. When originally installed T-shaped planks use the composite material of the present invention, the composite material can be installed by the same or similar process as will be discussed below when repairing damaged metal clips between T-shaped planks, or the concrete on the T-Shaped planks and/or concrete slabs can include pre-cut or preformed slots for the composite material of the present invention.

Referring now to FIG. 3, there is illustrated a damaged concrete deck that includes a damaged metal clip, not shown. To repair this damaged concrete structure, a slot 120 is cut into the concrete deck 20. Generally, the slot depth is greater than the thickness of the concrete deck 20 such that the slot depth fully penetrates through the complete thickness of the concrete deck; however, this is not required. As illustrated in FIGS. 4-5, the slot is cut fully through the width or thickness of the concrete deck and into the top portions 34 of the T-shaped planks 30. Generally, the slot is not fully cut through the complete thickness or width of the top portion of the T-shaped planks as illustrated in FIGS. 4-5; however, the slot can be cut fully through the complete thickness or width of the top portion of the T-shaped planks. When the slot is not fully cut through the complete thickness or width of the top portion of the T-shaped planks, the base 122 of slot 120 is generally spaced at least about 0.1 inches from the bottom surface 36 of the top portions of the T-shaped planks, typically spaced about 0.1-5 inches from the bottom surface 36 of the top portions of the T-shaped planks, more typically spaced about 0.1-2 inches from the bottom surface 36 of the top portions of the T-shaped planks, more typically spaced about 0.1-1 inches from the bottom surface 36 of the top portions of the T-shaped planks, and still more typically spaced about 0.1-0.5 inches from the bottom surface 36 of the top portions of the T-shaped planks. Depending on the location of the cut slot 120, the cut slot may or may not be cut through a preexisting metal clip. In practice, the slot is cut in a location that does not include the metal clip since the metal clip can damage the cutting blade and/or increase cutting time for the slot when the blade contacts the metal clip.

Slot 120 is generally cut by a saw blade (e.g., diamond tipped saw blade, etc.); however, the slot can be cut by other means. When the slot is cut by a circular saw blade, the two ends 124, 126 of the slot have a radius of curvature that is generally equal to the radius of curvature of the saw blade. As illustrated in FIG. 1, the slot is cut in the concrete deck 20 such that the longitudinal length or axis of the slot traverses gap 32. As illustrated in FIGS. 3 and 4, the cut slot is generally symmetrically oriented about gap 32; however, this is not required. The slot is cut generally straight along the longitudinal length of the slot; however, this is not required. The inside surfaces of the slot can be smooth or non-smooth. Generally, the inside surface of the cut slot is non-smooth so as to facilitate in the bonding of the composite material 100 in the slot. The longitudinal length of the slot is generally equal to or greater than the longitudinal length of the composite material. Typically, the longitudinal length of the slot is at least about 102% the longitudinal length of the composite material.

Slot 120 is also cut at a nonparallel angle to longitudinal length or axis of gap 32. As illustrated in FIG. 3, the longitudinal length or axis of the slot 120 is cut at an angle A relative to the longitudinal length or axis of gap 32. Generally the longitudinal length or axis of the slot is cut at an angle of about 10°-170° to the longitudinal length or axis of the gap, typically at an angle of about 20°-160°, more typically about 30°-150°, and even more typically about 45°-135°.

The width of the cut slot is generally uniform along the longitudinal length of the slot; however, this is not required. As illustrated in FIG. 5, the width of the slot is greater than the width of the composite material so that the composite material can be easily inserted into the slot and adhesive 130 can also be inserted into the slot to bond the composite material to the wall of the slot. Generally, the slot width in the concrete is about 105%-200% the width of the composite material, typically about 110%-250% the width of the composite material, and even more typically about 150%-200% the width of the composite material. The slot width may or may not be constant along the longitudinal length of the slot.

FIG. 4 illustrates that the depth of slot 120 is generally uniform, excluding the curved slot ends; however, this is not required. FIG. 4 also illustrates that the depth of slot 120 is greater than the depth or height of the composite material; however, this is not required. Generally, the depth of slot is at least about 75% the depth or height of the composite material, typically about 100%-200% the depth or height of the composite material, more typically about 105%-150% the depth or height of the composite material, and even more typically about 105%-125% the depth or height of the composite material. As illustrated in FIGS. 4 and 5, when the depth or height of the composite material is less than the depth of slot, the top surface 102 of the composite material is positioned below the top surface 24 of the concrete deck 20; however, this is not required. In such an arrangement, adhesive 130 is positioned completely about the outer surfaces of the composite material. The adhesive that is used is generally a two part, 100% solids epoxy adhesive that is thixotropic in nature; however, other or additional adhesives can be used. The adhesive can be fully or partially inserted into the slot before, during or after the composite material is inserted into the slot. The viscosity of the adhesive is generally selected so that it can be easily poured into the cut slot; however, this is not required. Adhesives that have viscosities that are too large to allow the flow of the adhesive into the slot can result in the improper bonding of the composite material in the cut slot. The curing time for the adhesive is generally at least about 0.25 hours, typically about 0.5-10 hours, and more typically about 1-5 hours. The bonding strength of the composite material to the concrete is about 1.5-4 MSI. The adhesive used to form the composite material is generally different from the adhesive used to bond the composite material in the slot; however, this is not required.

As illustrated in FIG. 4, the improved composite material is positioned in the slot so that it is generally symmetrically oriented (50%-50%) about the longitudinal axis G of gap 32; however, this is not required. Generally, the composite material is positioned in the slot so that about 30%-70% of the composite material is positioned on one side of the longitudinal axis of gap 32 and the remainder of the composite material on the other side of the longitudinal axis of the gap. Typically, the composite material is positioned in the slot so that about 40%-60% of the composite material is positioned on one side of the longitudinal axis of the gap and the remainder of the composite material on the other side of the longitudinal axis of the gap. More typically, the composite material is positioned in the slot so that about 45%-55% of the composite material is positioned on one side of the longitudinal axis of the gap and the remainder of the composite material on the other side of the longitudinal axis of the gap.

Figure 6:
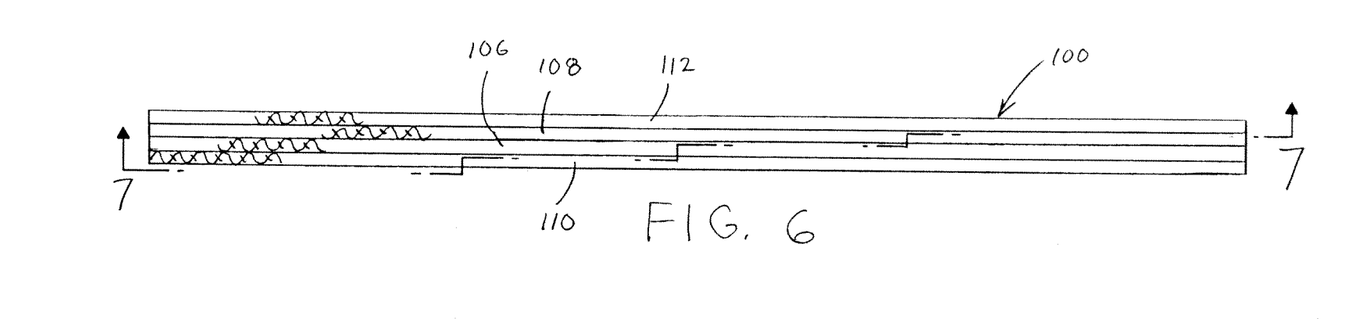
FIG. 6 is a top elevation view of the composite material of the present invention; and, FIG. 7 is a cross-sectional view along lines 7-7 of FIG. 6.
Figure 7:
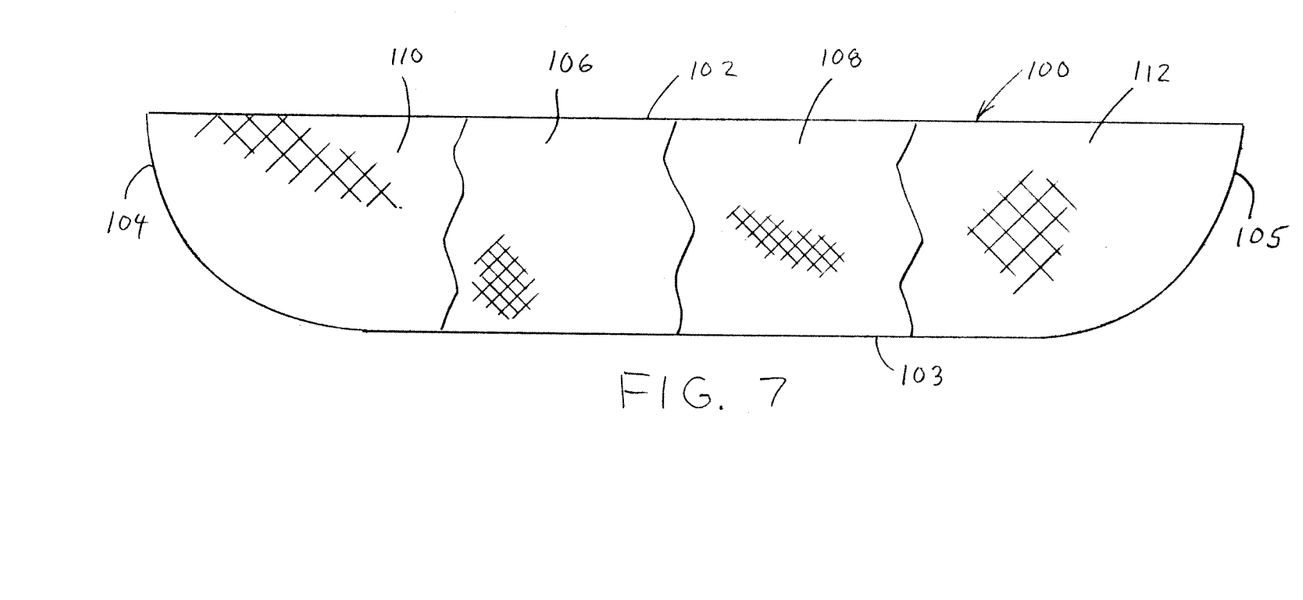

Referring now to FIGS. 5-7, composite material 100 is illustrated as formed of multiple layers; however, this is not required. As can be appreciated, composite material 100 can be formed of a single layer of fiber that is coated and/or saturated with an adhesive. Likewise, composite material 100 can be formed of a single layer of fabric that is coated and/or saturated with an adhesive. The composite material has a top edge 102, a bottom edge 103, a first end 104, and a second end 105. The first and second ends are illustrated as having a curved surface between the top and bottom edges; however, one or both of the ends can be straight or include some other shape. A majority of the top edge of the composite material is illustrated as being generally parallel to the bottom edge; however, this is not required. The top edge of the composite material is illustrated as having a longitudinal length that is greater than a longitudinal length of the bottom edge; however, this is not required. Generally the length of the bottom edge is about 10%-100% of the length of the top edge, typically about 25-100% of the length of the top edge, and more typically about 50-95% of the length of the top edge.

In one non-limiting configuration of the composite material, the composite material includes a first fiber system, a second fiber system and a resin material that connects together the first and second fiber system. The first and second fiber system can be formed of a) a single layer of fibers, b) two or more layers of fibers that are oriented in a non-parallel relationship to one another, c) one or more fabric layers wherein each fabric layer includes two or more layers of fibers that are oriented in a non-parallel relationship to one another and which fiber layers are woven or non-woven, and/or stitched together, heat bonded together, or otherwise connected together, or d) some combination of one or more fiber layers and one or more fabric layers. The first and second fiber systems can 1) have the same or different number of fiber layers, fiber volume, and/or fiber strands, 2) have the same or different types of fibers, 3) have the same or different tensile strength and/or tensile modulus, and/or 4) have the same or different number of fabric layers.

The first fiber system of the composite material is illustrated by layers 106, 108. The second fiber system is illustrated by layers 110, 112. Generally the composition of the first and second fiber systems is different; however, this is not required. In one non-limiting configuration, the first fiber system includes or is fully formed of carbon fibers. The fibers that form the first fiber system have a tensile strength of at least about 350 KSI and a tensile modulus of at least about 10 MSI. Generally, each of fiber layers 106 and 108 are or include a fabric layer; however, this is not required. Each of the fabric layers includes two or more layers of fibers oriented in a nonparallel relationship to one another. The two or more layers of fibers that form the fabric layers of the first fiber system are generally bonded and/or woven together prior to the first and second fiber systems being connected together; however, this is not required.

The fiber layers in the second fiber system include or can be fully formed of glass fiber material. The tensile strength of the glass fibers in the second fiber system can be less than, equal to or greater than the tensile strength of the carbon fibers in the first fiber system. The tensile modulus of the glass fibers in the second fiber system is generally less than the tensile modulus of the carbon fibers in the first fiber system. As illustrated in FIGS. 5-7, the second fiber system forms the outer layers of the composite material and is generally used to facilitate in bonding the composite material in slot 120. The second fiber system can also or alternatively be used to protect the layers of the first fiber material and/or enhance the strength of the composite material. Generally, each of the layers of the second fiber system is formed of or includes a fabric layer; however, this is not required. Each of the fabric layers in the second fiber system include two or more layers of fibers oriented in a nonparallel relationship to one another. The two or more layers of fibers that form the one or more fabric layers in the second fiber system are generally bonded and/or woven together prior to being connected to the first fabric component; however, this is not required.

A resin material is used to bond together the first and second fiber systems. Generally, the resin material is fully saturated into the first and second fiber systems; however, the first and/or second fiber system can be partially impregnated with and/or saturated with the resin material. The resin material partially or fully secures a) the one or more layers of second fiber system to the one or more layers of first fiber system, and/or b) partially or fully secures together the two or more fiber layers in the first and/or second fiber system. The resin material generally includes a vinyl ester resin. The first and second fiber systems are generally pressed together until the resin cures; however, this is not required. A vacuum can be applied during the pressing and curing steps; however, this is not required. Generally, the resin is allowed to cure and harden prior to the composite material being placed in the cut slot; however, this is not required.

Once the resin has cured, the composite material can be cut to a desired size and shape. The longitudinal length of the composite material is generally about 8-25 inches, and typically about 10-20 inches. The height or depth of the composite material is generally related to the depth of slot 120. The thickness or width of the composite material will vary depending on the thickness of the first fiber system and second fiber system. The thickness of the composite material can be uniform or vary along the longitudinal length of the composite material. When fully formed, the composite material has a tensile strength along the x-y axis or longitudinal axis of at least about 55 KSI, a compressive strength along the x-y axis or longitudinal axis of at least about 45 KSI, a compressive strength through the z axis or thickness of at least about 5.5 KSI, a shear strength through the z axis or thickness of at least about 11 KSI, and/or an inter laminar shear along the x-y axis or longitudinal axis of at least about 1.1 KSI.

The following Table provides performance values for three different thicknesses of composite material of the present invention. In each of the below examples, the composite material was formed of four layers as illustrated in FIGS. 5-7. The outer layers were formed of glass fibers and the inner layers were formed of carbon fibers. All four layers were fabric layers. The fabric layers for the carbon fibers were formed of three layers of fibers that were stitched together. A first carbon fiber layer runs generally parallel to the longitudinal axis of the fabric layer and the second and third fiber layers run non-parallel to the longitudinal axis of the fabric layer, and the second and third fiber layers have the same volume and same number of fibers, and the second layer runs at a positive angle A (e.g., 30°, 45°, 60°, etc.) to the longitudinal axis of the fabric layer and the third layer runs at a negative angle A (e.g., −30°, −45°, −60°, etc.) to the longitudinal axis of the fabric layer. The fabric layers for the glass fibers were formed of two layers of fibers that were stitched together. The two glass fiber layers ran generally perpendicular to one another. A vinyl ester was used to secure together the four layers. All four layers were substantially saturated with the vinyl ester. The vinyl ester was allowed to cure prior to the composite material being inserted into a cut slot. An epoxy adhesive was used to secure the composite material in the cut slot.

| Composite Material Type | Thickness (In.) | Tensile Capacity (PSI) | Compressive Capacity (PSI) | Shear Capacity (PSI) | Pull out Capacity |
|---|---|---|---|---|---|
| Light Duty | 0.11 | 36,500 | 32,551 | 6,921 | Concrete Failure |
| Standard | 0.17 | 56,406 | 50,306 | 10,706 | Concrete Failure |
| High Load | 0.23 | 76,300 | 68,061 | 14,485 | Concrete Failure |

One non-limiting method in accordance with the present invention includes:
  Cutting a slot in the damaged concrete area such that the slot crosses the longitudinal axis of the gap 32 between the T-shaped planks 30.
  Optionally cleaning the cut slot of debris prior to inserting the composite material in the cut slot.
  Optionally inserting an adhesive on one or both sides of the composite material prior to inserting the composite material in the cut slot.
  Inserting the composite material into the cut slot.
  Inserting an adhesive in the cut slot to secure the composite material in the cut slot.
  Allowing the adhesive to dry and/or cure.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A composite material for use in repairing concrete comprising a first fiber system, a second fiber system and a binding material, said first and second fiber systems having a top edge, a bottom edge, a first end, a second end, a front face, a back face, a length, a width and a depth, at least one of said first and second ends including a curved surface between said top and bottom edges, a majority of said top edge generally parallel to said bottom edge, said top edge having a longitudinal length that is greater than a longitudinal length of said bottom edge, a majority of said bottom edge generally parallel to said top edge, said first fiber system including at least one layer, each fiber layer of said first fiber system including a plurality of fibers, said second fiber system including at least one layer, each fiber layer of said second fiber system including a plurality of fibers, said binding material securing together said plurality of fibers in said at least one layer of said first and second fiber systems, said binding material securing together said back face of said first fiber system to said front face of said second fiber system.

2. The composite material as defined in claim 1, wherein said first and second ends of said first and second fiber systems include a curved surface between said top and bottom edges.

3. The composite material as defined in claim 2, wherein said curved surfaces of said first and second ends of said first and second fiber systems have the same radius of curvature.

4. The composite material as defined in claim 1, wherein said first fiber system includes fibers selected from the group consisting of carbon fibers, glass fibers, aramid fibers, boron fibers, and basalt fibers.

5. The composite material as defined in claim 4, said second fiber system including fibers selected from the group consisting of carbon fibers, glass fibers, aramid fibers, boron fibers, and basalt fibers.

6. The composite material as defined in claim 5, wherein said first fiber system has a fiber composition that is different from a fiber composition of said second fiber system, said second fiber system including first and second layers, said first fiber system positioned between said first and second layers of said second fiber system.

7. The composite material as defined in claim 6, wherein said first fiber system includes a fabric layer, said second fiber system including a fabric layer, said fabric layer of said first fiber system formed of first, second and third fiber layers, said first, second and third fibers layers laid in a nonparallel relationship to one another, said fabric layer of said second fiber system formed of first and second fiber layers, said first and second fibers layers laid in a nonparallel relationship to one another.

8. The composite material as defined in claim 1, wherein said composite has no openings through said front and back face.

9. The composite material as defined in claim 7, wherein said composite has no openings through said front and back face.

10. A reinforced structure comprising a deck disposed above two adjacently positioned T-shaped planks, a gap having a longitudinal axis positioned between said two adjacently positioned said T-shaped planks, a slot cut at least partially through said deck and at least partially through said T-shaped planks, a composite material at least partially positioned in said slot, an adhesive material positioned in said slot, said slot intersecting and crossing said longitudinal axis of said gap, said adhesive material formulated to connect and secure said composite material in said slot, said composite material including a first fiber system, a second fiber system and a binding material, said first and second fiber systems having a top edge, a bottom edge, a first end, a second end, a front face, a back face, a length, a width and a depth, said first fiber system including at least one fiber layer, each fiber layer of said first fiber system including a plurality of fibers, said second fiber system including at least one layer, each fiber layer of said second fiber system including a plurality of fibers said binding material securing together said plurality of fibers in said at least one layer of said first and second fiber systems, said binding material securing together said first and second fiber systems, said binding material securing together said back face of said first fiber system to said front face of said second fiber system.

11. The reinforced structure as defined in claim 10, wherein said slot is cut fully through said deck.

12. The reinforced structure as defined in claim 10, wherein said slot is cut at an angle of about 15°-165° relative to said longitudinal axis of said gap, said slot having a longitudinal axis that is non-parallel to said longitudinal axis of said gap.

13. The reinforced structure as defined in claim 10, wherein about 30-70 percent of a longitudinal length of said composite material is positioned on one side of said gap between said two adjacently positioned said T-shaped planks and a remainder of said longitudinal length of said composite material is positioned on the other side of said gap.

14. The reinforced structure as defined in claim 10, wherein at least one of said first and second ends including a curved surface between said top and bottom edges, a majority of said top edge generally parallel to said bottom edge, said top edge having a longitudinal length that is greater than a longitudinal length of said bottom edge, a majority of said bottom edge generally parallel to said top edge.

15. The reinforced structure as defined in claim 10, wherein said first fiber system has a fiber composition that is different from a fiber composition of said second fiber system, said second fiber system including first and second layers, said first fiber system positioned between said first and second layers of said second fiber system, said binding material binding said first fiber system to said second fiber system.

16. The reinforced structure as defined in claim 10, wherein said first fiber system includes fibers selected from the group consisting of carbon fibers, glass fibers, aramid fibers, boron fibers, and basalt fibers, said second fiber system including fibers selected from the group consisting of carbon fibers, glass fibers, aramid fibers, boron fibers, and basalt fibers, said first fiber system includes a fabric layer, said fabric layer including first and second fiber layers, said first and second fiber layers laid in a nonparallel relationship to one another, said first and second fiber layers connected together by stitching, heat bonding, adhesive, or combinations thereof, said first and second layers of said second fiber system includes a fabric layer, said fabric layer including first and second fiber layers, said first and second fiber layers laid in a nonparallel relationship to one another, said first and second fiber layers connected together by stitching, heat bonding, adhesive, or combinations thereof.

17. A method for repairing a longitudinal axis of said concrete structure that includes a concrete deck disposed above two adjacently positioned T-shaped concrete planks, and a gap having a longitudinal axis positioned between said two adjacently positioned T-shaped concrete planks, said method comprising:
   a) providing a composite material, said composite material including a first fiber system, a second fiber system and a binding material, said first and second fiber systems having a top edge, a bottom edge, a first end, a second end, a front face, a back face, a length, a width and a depth, said first fiber system including at least one fiber layer, each fiber layer of said first fiber system including a plurality of fibers, said second fiber system including at least one layer, each fiber layer of said second fiber system including a plurality of fibers said binding material securing together said plurality of fibers in said at least one layer of said first and second fiber systems, said binding material securing together said first and second fiber systems, said binding material securing together said back face of said first fiber system to said front face of said second fiber system;
   b) cutting a slot in said concrete deck, said slot intersecting and crossing said longitudinal axis of said gap;
   c) inserting said composite material in said slot; and,
   d) inserting a curable material in said slot to secure said composite material in said slot.

18. The method as defined in claim 17, wherein said slot is cut at an angle of about 15°-165° relative to said longitudinal axis of said gap, said slot having a longitudinal axis that is non-parallel to said longitudinal axis of said gap.

19. The method as defined in claim 17, wherein about 30-70 percent of a longitudinal length of said composite material is positioned on one side of said gap between said two adjacently positioned said T-shaped planks and a remainder of said longitudinal length of said composite material is positioned on the other side of said gap.

20. The method as defined in claim 17, wherein at least one of said first and second ends including a curved surface between said top and bottom edges, a majority of said top edge generally parallel to said bottom edge, said top edge having a longitudinal length that is greater than a longitudinal length of said bottom edge, a majority of said bottom edge generally parallel to said top edge.

21. The method as defined in claim 17, wherein said first fiber system has a fiber composition that is different from a fiber composition of said second fiber system, said second fiber system including first and second layers, said first fiber system positioned between said first and second layers of said second fiber system, said binding material binding said first fiber system to said second fiber system.

22. The method as defined in claim 17, wherein said first fiber system includes fibers selected from the group consisting of carbon fibers, glass fibers, aramid fibers, boron fibers, and basalt fibers, said second fiber system including fibers selected from the group consisting of carbon fibers, glass fibers, aramid fibers, boron fibers, and basalt fibers, said first fiber system includes a fabric layer, said fabric layer including first and second fiber layers, said first and second fiber layers laid in a nonparallel relationship to one another, said first and second fiber layers connected together by stitching, heat bonding, adhesive, or combinations thereof, said first and second layers of said second fiber system includes a fabric layer, said fabric layer including first and second fiber layers, said first and second fibers layers laid in a nonparallel relationship to one another, said first and second fiber layers connected together by stitching, heat bonding, adhesive, or combinations thereof.

23. The composite material as defined in claim 3, wherein said first fiber system includes fibers selected from the group consisting of carbon fibers, glass fibers, aramid fibers, boron fibers, and basalt fibers.

24. The composite material as defined in claim 23, said second fiber system including fibers selected from the group consisting of carbon fibers, glass fibers, aramid fibers, boron fibers, and basalt fibers.

25. The composite material as defined in claim 24, wherein said first fiber system has a fiber composition that is different from a fiber composition of said second fiber system, said second fiber system including first and second layers, said first fiber system positioned between said first and second layers of said second fiber system.

26. The composite material as defined in claim 25, wherein said first fiber system includes a fabric layer, said second fiber system including a fabric layer, said fabric layer of said first fiber system formed of first, second and third fiber layers, said first, second and third fiber layers laid in a nonparallel relationship to one another, said fabric layer of said second fiber system formed of first and second fiber layers, said first and second fibers layers laid in a nonparallel relationship to one another.

27. The composite material as defined in claim 26, wherein said composite has no openings through said front and back face.

28. The reinforced structure as defined in claim 11, wherein said slot is cut at an angle of about 15°-165° relative to said longitudinal axis of said gap, said slot having a longitudinal axis that is non-parallel to said longitudinal axis of said gap.

29. The reinforced structure as defined in claim 12, wherein about 30-70 percent of a longitudinal length of said composite material is positioned on one side of said gap between said two adjacently positioned said T-shaped planks and a remainder of said longitudinal length of said composite material is positioned on the other side of said gap.

30. The reinforced structure as defined in claim 29, wherein at least one of said first and second ends including a curved surface between said top and bottom edges, a majority of said top edge generally parallel to said bottom edge, said top edge having a longitudinal length that is greater than a longitudinal length of said bottom edge, a majority of said bottom edge generally parallel to said top edge.

31. The reinforced structure as defined in claim 30, wherein said first fiber system has a fiber composition that is different from a fiber composition of said second fiber system, said second fiber system including first and second layers, said first fiber system positioned between said first and second layers of said second fiber system, said binding material binding said first fiber system to said second fiber system.

32. The reinforced structure as defined in claim 31, wherein said first fiber system includes fibers selected from the group consisting of carbon fibers, glass fibers, aramid fibers, boron fibers, and basalt fibers, said second fiber system including fibers selected from the group consisting of carbon fibers, glass fibers, aramid fibers, boron fibers, and basalt fibers, said first fiber system includes a fabric layer, said fabric layer including first and second fiber layers, said first and second fiber layers laid in a nonparallel relationship to one another, said first and second fiber layers connected together by stitching, heat bonding, adhesive, or combinations thereof, said first and second layers of said second fiber system includes a fabric layer, said fabric layer including first and second fiber layers, said first and second fiber layers laid in a nonparallel relationship to one another, said first and second fiber layers connected together by stitching, heat bonding, adhesive, or combinations thereof.

33. The method as defined in claim 17, wherein said slot is cut fully through said concrete deck.

34. The method as defined in claim 19, wherein about 30-70 percent of a longitudinal length of said composite material is positioned on one side of said gap between said two adjacently positioned said T-shaped planks and a remainder of said longitudinal length of said composite material is positioned on the other side of said gap.

35. The method as defined in claim 34, wherein at least one of said first and second ends including a curved surface between said top and bottom edges, a majority of said top edge generally parallel to said bottom edge, said top edge having a longitudinal length that is greater than a longitudinal length of said bottom edge, a majority of said bottom edge generally parallel to said top edge.

36. The method as defined in claim 35, wherein said first fiber system has a fiber composition that is different from a fiber composition of said second fiber system, said second fiber system including first and second layers, said first fiber system positioned between said first and second layers of said second fiber system, said binding material binding said first fiber system to said second fiber system.

37. The method as defined in claim 36, wherein said first fiber system includes fibers selected from the group consisting of carbon fibers, glass fibers, aramid fibers, boron fibers, and basalt fibers, said second fiber system including fibers selected from the group consisting of carbon fibers, glass fibers, aramid fibers, boron fibers, and basalt fibers, said first fiber system includes a fabric layer, said fabric layer including first and second fiber layers, said first and second fiber layers laid in a nonparallel relationship to one another, said first and second fiber layers connected together by stitching, heat bonding, adhesive, or combinations thereof, said first and second layers of said second fiber system includes a fabric layer, said fabric layer including first and second fiber layers, said first and second fibers layers laid in a nonparallel relationship to one another, said first and second fiber layers connected together by stitching, heat bonding, adhesive, or combinations thereof.

* * * * *